Sept. 15, 1942.  C. R. DUNCAN  2,295,723
AUTOMOBILE STEERING AND IGNITION LOCKING ASSEMBLY
Filed Oct. 13, 1941   3 Sheets-Sheet 2
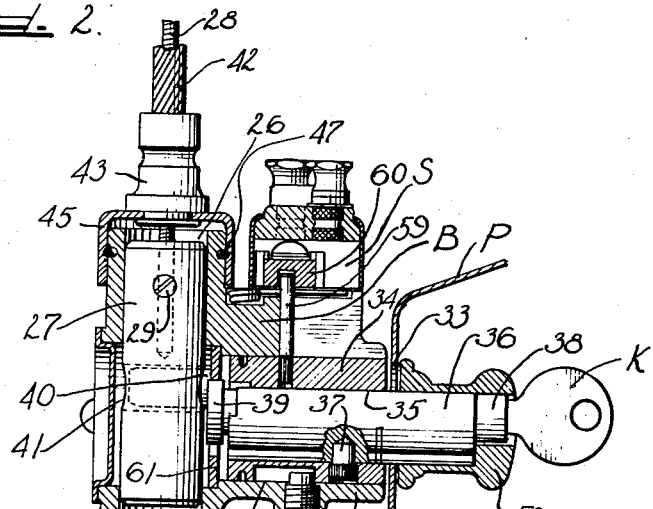
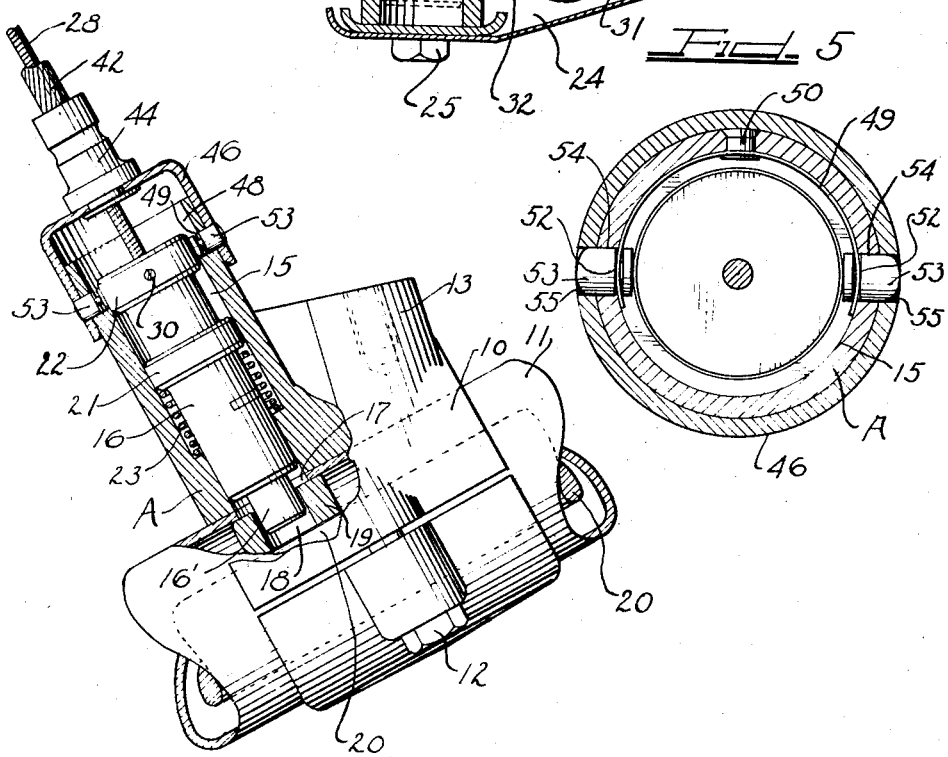
Inventor
CHARLES R. DUNCAN Sept. 15, 1942.  C. R. DUNCAN  2,295,723
AUTOMOBILE STEERING AND IGNITION LOCKING ASSEMBLY
Filed Oct. 13, 1941  3 Sheets-Sheet 3
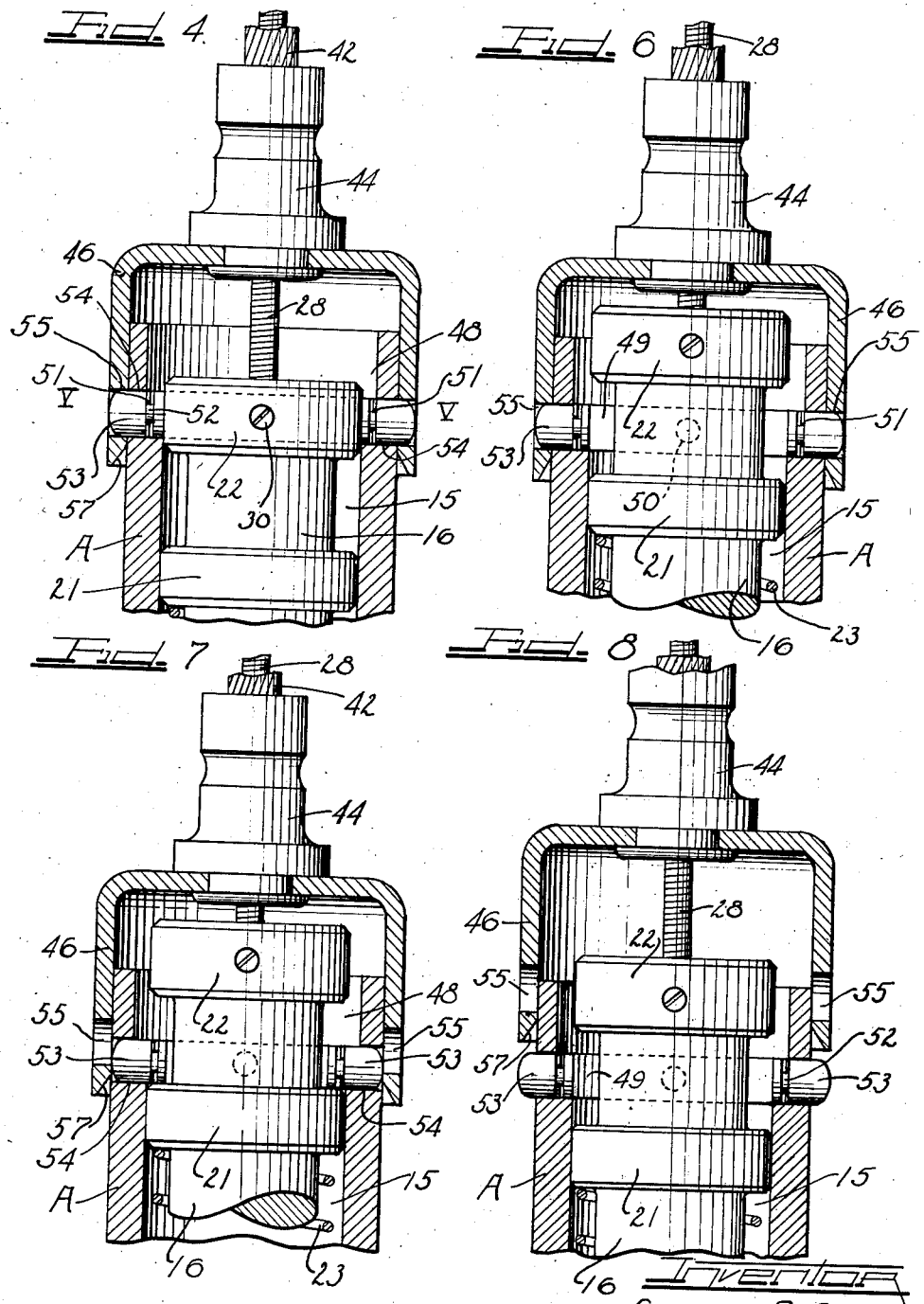
Inventor
CHARLES R. DUNCAN Patented Sept. 15, 1942

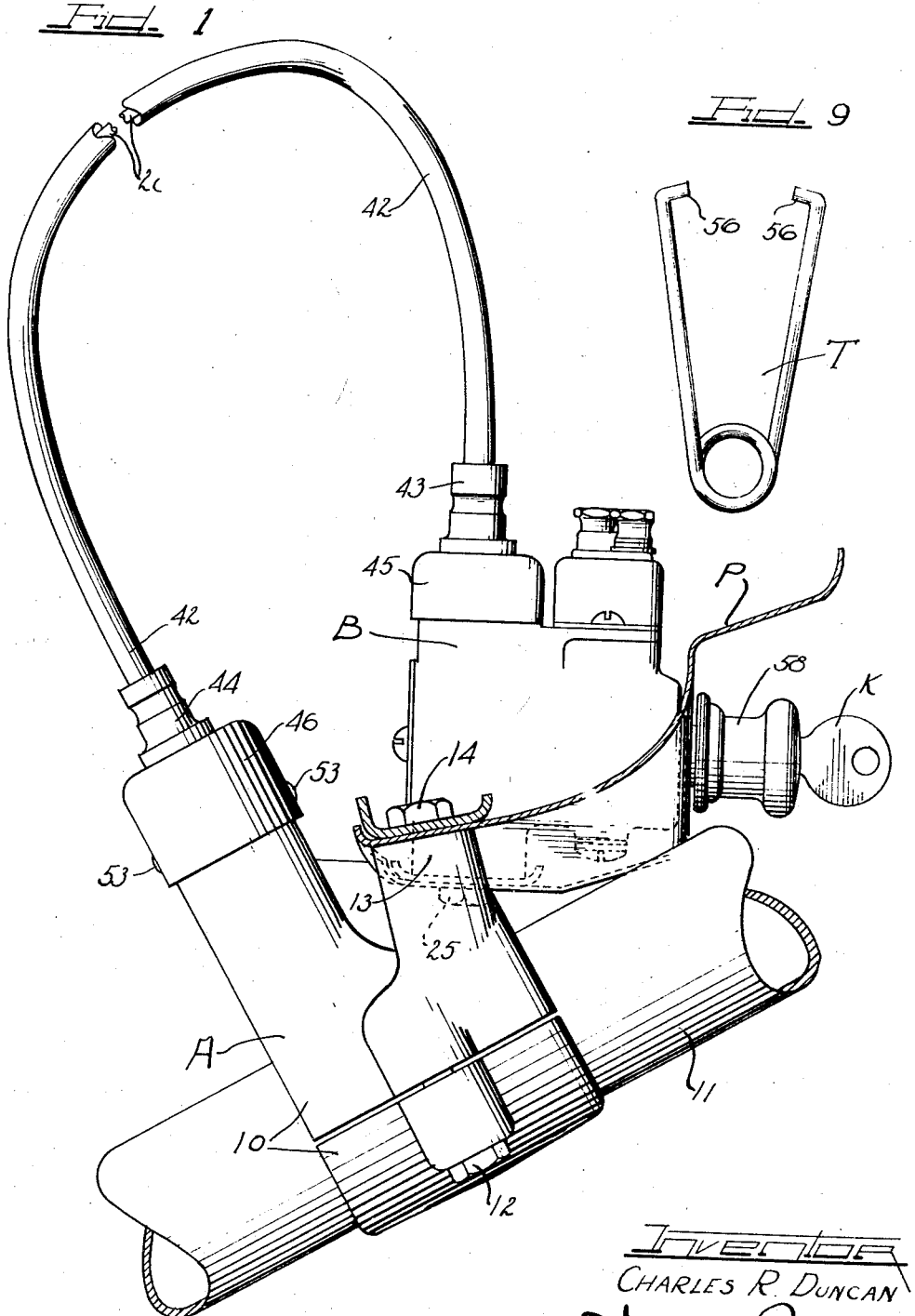

2,295,723

UNITED STATES PATENT OFFICE 2,295,723

AUTOMOBILE STEERING AND IGNITION LOCKING ASSEMBLY

Charles R. Duncan, Waukegan, Ill., assignor to Houdaille-Hershey Corporation, Detroit, Mich., a corporation of Michigan Application October 13, 1941, Serial No. 414,761

5 Claims. (Cl. 70—186)

This invention relates to steering and ignition locking assemblies in which a steering locking bolt operable in a frame on the steering column is connected by a flexible cable with a key operable member in a frame mounted in the automobile remote from the steering column, as for example on the instrument panel, such assembly being shown in the copending application of Ray A. Sandberg, Serial No. 411,793 filed September 22, 1941.

As shown in this copending Sandberg application, the cable extending between the steering locking bolt and the actuating member is housed in a flexible protecting metal sheath which at its ends has cap members applied to the respective frames. As the frame in which the steering locking bolt is operable is usually assembled on the vehicle chassis, and the frame for the key operable cable actuating member is assembled on the vehicle body, it is desirable to provide for disconnection of the cable means so that when the body is assembled on the chassis, the cable connection can be readily applied. It is important, however, that unlawful disconnection of the cable means be prevented, particularly when the steering locking bolt is in locking position so that the vehicle cannot be unlawfully operated.

The important object of my invention is to provide simplified and more easily operable means for effecting quick and easy attachment of the cable sheath to one of the frames, and ready detachment thereof, and with the detachment prevented when the steering locking bolt is in locking position. The various features of my invention are incorporated in the structure shown on the drawings, in which drawings:

Figure 1 is a side elevation of an assembly comprising the steering bolt frame mounted on the steering column and the frame for the cable actuating means mounted on the instrument panel;

Figure 2 is a vertical section through the frame on the instrument panel;

Figure 3 is a side elevation of the frame on the steering column with the part of the frame in which the steering locking bolt operates shown in section;

Figure 4 is an enlarged section of the steering locking bolt receiving end of the frame on the steering column showing the cable sheath cap locked to the frame while the steering locking bolt is in locking position;

Figure 5 is a section on plane V—V Figure 4;

Figure 6 is a section like Figure 4 showing the steering locking bolt in its unlocking position so as to permit unlocking of the cable sheath cap from the frame;

Figure 7 is a section like Figure 4 showing locking buttons released from the cable sheath cap for partial movement of the cap away from the frame;

Figure 8 is a similar section showing the steering locking bolt returned to locking position for final release of the cap from the frame; and Figure 9 is a plan view of a tool which may be used for unlocking the locking buttons from the cable sheath cap.

Referring to Figures 1, 2 and 3, the locking assembly comprises the frame A having the split collar 10 for receiving the steering column 11, the collar being rigidly contracted around the column as by means of a screw 12. The frame A has the upwardly extending boss 13 engaging at its upper end against the under side of the instrument panel P to which it is secured as by means of a screw 14.

The frame body A has the bore 15 therethrough in which the steering locking bolt 16 is shiftable, the bolt, when in its locking position as shown on Figure 3, having its end 16' projecting through a hole 17 of the steering column and into the recess 18 in the bushing 19 secured to the steering shaft 20 which extends through the column.

The bolt 16 has inner and outer collars or heads 21 and 22 respectively, the head 21 guiding the bolt in the bore 15 and serving as an abutment for a spring 23 engaging between the head and the bottom of the bore. The outer head 22 cooperates with locking means, to be more fully described later, for preventing detachment of the cable structure from the frame A when the locking bolt is in locking position.

The frame B for the locking bolt controlling means is mounted within a recess 24 formed in the instrument panel P, the frame being held to the panel as by means of a screw 25.

The rear portion of the frame B has the bore 26 therethrough in which an actuating member 27 in the form of a plunger is shiftable. This actuating member is secured to one end of a flexible cable 28 as by a set screw 29, the other end of the cable being secured to the steering locking bolt 16 as by means of a set screw 30. Shift of the actuating member 27 in the bore 26 will thus, through the cable connection, shift the steering locking bolt 16 to locking or unlocking position.

The frame B has the forwardly extending part 31 through which extends the bore 32 at right angles with the bore 26, the frame part 31 terminating just behind the opening 33 in the instrument panel P. A sleeve 34 is axially movable in the bore 32 and has the bore 35 for a lock cylinder 36 secured therein against rotary or axial movement as by set screw 37. Extending through the lock barrel for rotation therein is a lock cylinder 38 operable by a key K. At its inner end the lock barrel 38 has the cylindrical head 39 from which a pin 40 extends eccentric with the head and through a cross slot 41 in the actuating member 27, so that upon turning of the key K the actuating member 27 will be shifted in the bore 26 for movement of the cable 28 for shift of the steering locking bolt 16 to locking or unlocking position.

The flexible cable 28 is protected by a flexible metal sheath 42 which at its ends is rigidly secured to fittings 43 and 44 respectively to which caps 45 and 46 respectively are rigidly secured, these caps being cylindrical. The cap 45 receives the upper end of the frame B and may be locked to the frame against axial movement as by means of a circular spring key 47 engaging in opposed circumferential grooves in the frame and the cap respectively, in a manner well understood in the art.

The cap 46 receives the upper end of the frame A and is made detachable. Referring to Figures 3 to 8, the bore 15 at its outer end is of increased diameter as indicated at 48, and in this space is a spring 49 of substantially semi-circular extent, the spring at its middle point being secured against the frame as by means of a rivet 50. The free ends of the frame have the longitudinally extending slots 51 receiving the neck portions 52 at the inner ends of cylindrical locking buttons or pins 53, two such buttons, diametrically opposite, being shown. These buttons extend through passageways 54 in the frame A and are adapted to project into or throuh openings 55 in the sidewall of the cap 46. The spring 49 tends to shift these buttons and to hold them in their outer position, and when the cap 46 is in place on the frame A these buttons will be projected into the cap openings 55 to hold the cap against removal from the frame.

These buttons are so arranged that, when the steering locking bolt is in its locking position as shown on Figures 3, 4 and 5, the outer head 22 of the locking bolt will be in the path of the buttons so that they cannot be shifted inwardly out of the cap holes 55 for release of the cap. Before the cap can be released, the locking bolt must be shifted to its unlocking position to withdraw the head from the path of the buttons and such shift of the locking bolt is accomplished by turning of the key K for actuation of the actuating or setting member 27. With the locking bolt in its unlocking position, as shown on Figure 6, the buttons or pins 53 will be opposite the space between the heads on the locking bolt and will be free to be shifted axially inwardly for withdrawal of their ends from the cap holes 55. Figure 9 shows a simple tool T by means of which the locking pins may be readily shifted to release the cap. This tool is in the form of a length of spring wire bent to U-form and having its ends 56 deflected at right angles for engagement with the outer ends of the locking pins. As soon as the locking pins have been shifted inwardly by the tool and out of the cap holes, as shown on Figure 7, the cap may be shifted outwardly to bring its solid portion in front of the pin ends to hold the pins in unlocking position but, with the arrangement shown, the inner head 21 of the locking bolt will encounter the pins and prevent further outward movement of the bolt with the cap and the cable and sheath. However, upon turning of. the key to shift the steering locking bolt back to locking position, as shown on Figure 8, the cap may be further withdrawn until its end leaves the locking pins before the steering bolt inner head 21 reaches the pins, and then the cap is entirely freed from the frame A and can be withdrawn from the frame, and with it, the cable and the steering locking bolt secured thereto.

To reapply the cable structure to the frame A, the steering locking bolt is reinserted into the bore 15 of frame A and the cap 46 applied to the end of the frame and shifted inwardly. Before doing this the steering locking bolt should first be set, by turning of the key, to its steering locking position and then the bolt is inserted into the bore 15 and the cap 46 applied to the outer end of the frame A and shifted inwardly with the bolt. The inner head 21 of the steering locking bolt will then pass the inner ends of the locking buttons 53 before the end of the cap engages the buttons. The buttons may be pushed inwardly by hand, or preferably the lower edge of the cap is beveled as indicated at 57 so that the buttons will be pushed in as the cap is shifted inwardly. Such inward shift will be just before the outer head 22 of the steering locking bolt reaches the pins, and then the pins will be in the path of the outer head to prevent further or final inward shift of the head, and the key must therefore be turned to shift the steering locking bolt outwardly to its unlocking position relative to the cap and then the cap may be shifted to its full inner position so that the spring 49 may shift the pins outwardly through the openings 55 in the cap for relocking of the cap to the frame A. In the particular assembly shown on the drawings and as disclosed in the Sandberg copending application referred to, the inner head 21 is provided on the steering locking bolt to form the abutment for the spring 23, the function of this spring being to shift the locking bolt to its outer or unlocking position in case of breakage of the cable connection so that the car may still be driven and steered. In the assembly shown it is therefore necessary to manipulate the key for detaching or reattachment of the cap 46. Where the steering locking bolt, inwardly of its head 22, is free of any abutments which might interfere with the locking pins 53, all that would be necessary for detachment of the cap 46 would be to first shift the steering locking bolt to its unlocking position and then to shift the locking pins inwardly for release of the cap so that the cap with the locking bolt can be withdrawn from the frame A. Then for reapplication of the cap the steering locking bolt would first be set to its unlocking position relative to the cap and the bolt then reapplied in the frame A and the cap will then engage with the locking pins to shift them inwardly for reengagement of the pins in the cap openings 55 in advance of the head 22 for relocking of the cap to the frame A and freeing of the bolt for shift to locking or unlocking position during service.

The switch structure S on the frame B may be the same as that disclosed in the copending Sandberg application hereinbefore referred to, the switch control being effected by axial shift of the sleeve 34 by means of the knob 58, the pin 59 extending from the sleeve for shifting of the switch block 60 to switch opening or closing position. The head 39 and the pin 40 on the lock barrel 38 cooperate with a locking plate 61 in the same manner as in the structure of the Sandberg copending application to prevent switch closure while the steering is locked and to prevent steering locking until the switch is reopened.

I thus provide a simple and efficient arrangement for attachment or detachment of a cable connection between remote locking elements in an automotive vehicle. I have shown a practical and efficient embodiment of my invention but I do not desire to be limited to the exact construction and operation shown and described, as changes and modifications may be made without departing from the scope of the invention.

I claim as follows:

1. An automobile steering locking assembly comprising a first frame mounted adjacent to the steering shaft of the automobile, said frame having a bore, a locking bolt shiftable in said bore for locking and unlocking the shaft against steering, a second frame mounted in the automobile remote from said first frame, said second frame having a bore, a plunger shiftable in said bore, key means on said second frame for controlling the shift of the plunger, a flexible cable connecting at its ends with said bolt and said plunger respectively, whereby shift of said plunger will effect shift of the locking bolt to steering locking or unlocking position, a flexible sheath through which said flexible cable extends, means for attaching one end of said sheath to said second frame, a cap secured to the other end of said sheath for application to said first frame concentric with the bore thereof, said cap having a side opening, a locking pin shiftable radially on said first frame, spring means within said first frame tending to shift said locking pin outwardly for projection through the side hole of the cap after application of the cap to the frame for holding said cap on said frame, and means on the locking bolt positioned in the path of inward movement of said pin when said locking bolt is in locking position for preventing inward shift of said locking pin and thereby removal of said cap from the frame.

2. An automobile steering locking assembly comprising a first frame mounted on the steering column surrounding the steering shaft, said frame having a bore therethrough, a locking bolt shiftable in said bore for locking and unlocking the shaft against steering, a second frame mounted in the automobile remote from said first frame, an actuating member shiftable in said second frame and means on said second frame controlling the shift of said actuating member, a flexible connector secured at its ends to the outer ends of said bolt and said actuating member respectively whereby shift of said actuating member will effect shift of said bolt to steering locking or unlocking position, a protecting sheath through which said connector extends, means for attaching said sheath at one end to said second frame, a cap at the other end of said sheath for engaging the end of said first frame in alignment with the bore therethrough, said first frame having a passageway from said bore to the outside thereof, a locking pin for said passageway, said cap having a side opening for registering with said frame passageway when the cap is seated on said frame, spring means within said frame bore tending to shift said locking pin outwardly in said passageway to hold said cap to the frame, said pin being shiftable inwardly for release of the cap when said bolt is in steering unlocking position, and an abutment on said bolt located in the path of inward movement of said pin when said bolt is in steering locking position whereby detachment of said cap will be prevented.

3. An automobile steering locking assembly comprising a first frame adapted to be mounted on the steering column through which the steering shaft extends, said frame having a bore, a bolt shiftable in said bore for locking or unlocking said shaft against steering, a second frame mounted remote from said first frame, an actuating member movable in said second frame and means on said second frame operable to control the movement of said actuating member, a flexible cable secured at its ends to said bolt and said actuating member respectively whereby movement of said actuating member will effect movement of the bolt to steering locking or unlocking position, a sheath through which said cable extends, means securing one end of said sheath to said second frame, a cap secured to the other end of said sheath for receiving the end of the first frame at the end of the bore therethrough, diametrally opposite passageways in said frame between the end of the bore and the exterior thereof, locking pins shiftable radially in said passageways, said cap having diametrally opposite openings for registering with said frame passageways when the cap is applied to the frame, spring means within said bore yieldingly shifting said pins through the aligned passageways for holding said cap to said frame, and means controlled by the position of said bolt in said bore for preventing inward shift of said pins to thereby prevent removal of said cap from said frame.

4. An automobile steering locking assembly comprising a first frame adapted to be mounted on the steering column through which the steering shaft extends, said frame having a bore, a bolt shiftable in said bore for locking or unlocking said shaft against steering, a second frame mounted remote from said first frame, an actuating member movable in said second frame and means on said second frame operable to control the movement of said actuating member, a flexible cable secured at its ends to said bolt and said actuating member respectively whereby movement of said actuating member will effect movement of the bolt to steering locking or unlocking position, a sheath through which said cable extends, means securing one end of said sheath to said second frame, a cap secured to the other end of said sheath for receiving the end of the first frame at the end of the bore therethrough, diametrally opposite passageways in said frame between the end of the bore and the exterior thereof, locking pins shiftable radially in said passageways, said cap having diametrally opposite openings for registering with said frame passageways when the cap is applied to the frame, spring means within said bore yieldingly shifting said pins through the aligned passageways for holding said cap to said frame, said bolt when in its unlocking position permitting inward shift of said pins for detachment of said cap but in its locking position blocking inward movement of the pins to thereby prevent removal of the cap.

5. An automobile steering locking assembly comprising a frame mounted adjacent to the steering shaft and having a bore, a locking bolt shiftable in said bore for unlocking or locking said shaft, a flexible cable extending from said bolt, a second frame remote from said first frame, an actuating member in said second frame and means for operating said actuating member, the other end of said cable being connected with said actuating member, a sheath for said cable attached at one end to said second frame, a cap at the other end of said sheath for receiving the end of the first frame, said first frame having passageways between the end of the bore and the exterior, locking pins shiftable radially in said passageways, a spring secured intermediate its ends in said bore and having its free ends connected with said pins and tending to shift said pins outwardly, said cap having side openings for registering with said frame passageways and for receiving the ends of the projected pins whereby said cap will be held to said first frame, and means whereby said pins may be shifted inwardly to release said cap when said bolt is in unlocking position but to prevent inward shift of the pins when said bolt is in locking position.

CHARLES R. DUNCAN.